United States Patent
Cannon et al.

[15] 3,680,430
[45] Aug. 1, 1972

[54] ANCHOR BOLT

[72] Inventors: Robert E. Cannon, Hibbing, Minn.;
LeRoy H. Frailing, Rochester, Mich.

[73] Assignee: Cannon and Associates, Inc., Hibbing, Minn.

[22] Filed: May 6, 1970

[21] Appl. No.: 35,044

[52] U.S. Cl. .................................................. 85/79
[51] Int. Cl. ........................................... F16b 13/04
[58] Field of Search ................ 85/79, 155; 61/45 B

[56] References Cited

UNITED STATES PATENTS

| 780,960 | 1/1905 | Palmer | 85/79 |
| 3,301,123 | 1/1967 | Worley | 85/79 |
| 321,565 | 7/1885 | Young | 85/79 |
| 2,560,525 | 7/1951 | Nyl | 85/79 |

FOREIGN PATENTS OR APPLICATIONS 965,848   6/1957   Germany ...................... 61/45 B

*Primary Examiner*—Edward C. Allen
*Attorney*—Schroeder, Siegfried & Ryan

[57] ABSTRACT

An improved anchor bolt in which composite bolt parts includes an active section in which the mating surfaces are inclined at an angle to the center line of the bolt to provide a gripping or frictional surface over the entire length of the active section of the bolt and an inactive section where the mating surfaces of the same are parallel to the center line of the bolt to provide for positioning of the active section in varying positions in a bore hole.

8 Claims, 7 Drawing Figures

PATENTED AUG 1 1972 3,680,430
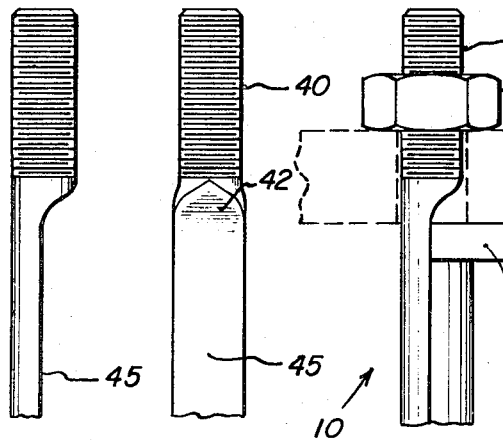
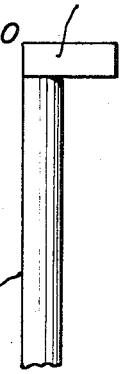
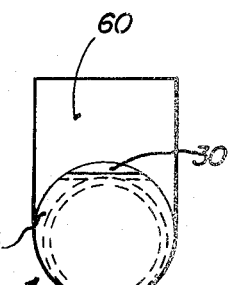
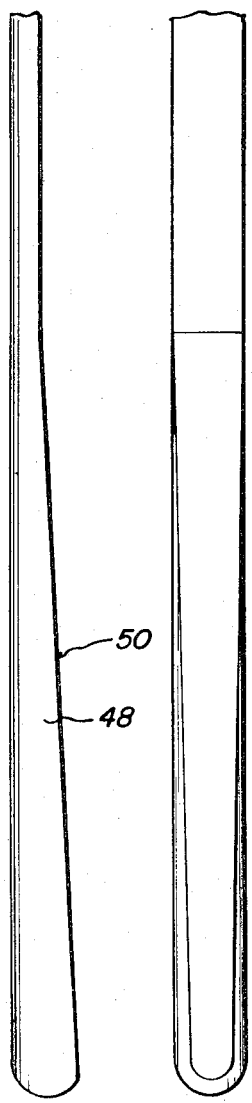
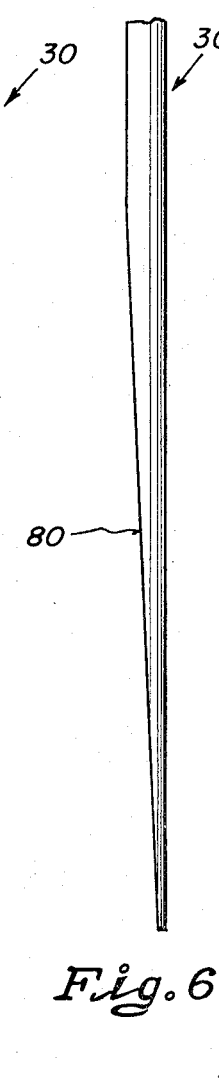
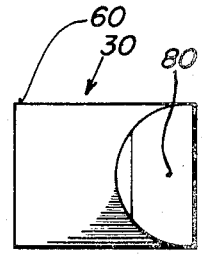
INVENTOR.
ROBERT E. CANNON
BY LEROY H. FRAILING
Schroeder Siegfried & Ryan
ATTORNEYS

ANCHOR BOLT

My invention relates to anchoring devices of the type particularly employed for the purpose of anchoring or securing an object to rock formations, or in concrete or other similar hard structures, and more particularly to an improved anchoring bolt of this type.

Anchoring devices, wedges and bolts have previously been designed for and employed in varying types of applications including earth and rock anchors. Generally, these prior structures, where they have been applied as anchors in rock or similar hard formation or objects, have been complex, difficult to use and generally nonretrievable. In addition, such structures are installed by initially drilling a hole in the area or surface to which the anchor is to be applied and in certain applications a variation in density of the material or the disposition of the hard rock beneath the material at a depth beyond the anchor have prevented application of the bolts or provide an unreliable retaining structure. In addition, present day anchors are not suitable for anchoring at extreme depths where bed rock is located below the ground surface at significant depths and are normally not readily retrievable. Further, the prior devices of this type have been unsatisfactory in that they provide a minimum of gripping surface and, consequently, require extremely large anchors for large holding force requirements.

The improved anchor bolt of the present invention is directed to a simplified anchoring structure which may be made in varying lengths and which provides a maximum gripping surface to provide an extremely secure anchor applicable for securing heavy machinery, such as drills or the equivalent structure, or to provide permanent retaining points in heavy rock formations, concrete structures or similar surfaces. Further, the anchor bolt can be used with relatively small diameter drilled holes and still provide extremely high anchoring forces to reduce bolt and installation costs. The improved anchor bolt provides a simplified two-part structure which is inserted into a drill hole and which is expanded by withdrawing one part of the same through operation of a nut to expand the bolt over the entire length of the same and provide an extremely large gripping surface and a very rigid anchor. The improved anchor bolt is readily retrievable by reversing the direction of movement of the element advanced by the nut, as by pounding or otherwise reinserting the same, to release the entire structure and provide a retrievable bolt element which eliminates loss of such securing structures. In addition, this improved design facilitates making the shank of the bolt at any desired length such that it has application for anchoring at a varying depth to insure extremely hard securing surfaces for the anchoring point and maximum securing force. While the improved anchor bolt structure is particularly applicable for mining applications or otherwise securing extremely large masses for stability purposes, its application extends to any point or structure wherein large gripping surfaces are required and in which extremely strong anchoring or securing devices are needed.

Therefore, it is the principal object of this invention to provide an improved anchor bolt.

Another object of this invention is to provide in an improved anchor bolt a structure particularly adaptable for anchoring large masses through extremely large gripping surfaces extending over substantially the entire extent of the bolt.

A further object of this invention is to provide an improved anchor bolt which involves the simplified two-part structure which is easy to install and is readily retrievable after use.

Another object of this invention is to provide an improved anchor bolt design which is readily adaptable for construction in varying length bolts to permit application of the same at varying depths.

These and other objects of this invention will become apparent from a reading of the attached description, together with the drawings, wherein:

FIG. 1 is an elevation view of the improved anchor bolt;

FIG. 2 is an end elevation view of the improved anchor bolt;

FIG. 3 is a plan view of one part of the improved anchor bolt;

FIG. 4 is a side elevation view of the part of the anchor bolt shown in FIG. 3;

FIG. 5 is a plan view of a second part of the anchor bolt;

FIG. 6 is a side elevation view of the anchor bolt part of FIG. 5; and

FIG. 7 is an end elevation view of the anchor bolt part of FIG. 5.

In the drawings, my improved anchor bolt is indicated generally at 10 as comprising a two-part structure, identified generally at 20 and 30. The composite structure, as shown in FIGS. 1 and 2, is an elongated bolt element which has a substantially cylindrical cross sectional element throughout its extent in the inactive position. The anchor part 20 includes a cylindrical shank extremity 40 which is threaded and has a diametrical dimension which is shown as slightly less than the overall diametrical dimension of the composite shank extremity of the bolt. This difference in dimension is shown herein to indicate that the improved anchor bolt may be made in varying diametrical dimensions or sizes and would normally utilize a threaded portion and a nut for the same of the same diametrical dimension to facilitate stocking of nuts and tools for applying the bolt.

As will be hereinafter pointed out, the gripping surface of the bolt is determined by the cylindrical surface of the active portion of the bolt and for increased gripping or anchoring forces, it is desirable to use bolts of different diametrical dimensions. The length of the bolt may vary, depending upon the application and the depth at which the gripping surface is to be applied. Thus, the bolt may be made in a series of lengths in which, for a given diametrical dimension, the active portion will remain at the same length and the inactive portion will provide the means for positioning the active portion at a desired depth. It will be also recognized that the bolt may be applied to other than rock or cement products as a means for an anchor and may be utilized to hold metallic objects or similar structures together or as an anchor in such materials utilizing the same frictional principles. The slope of the active portion, as will be hereinafter noted, is determined by the overall diametrical dimension of the bolt which will allow the bolt to expand within a given range of movement of parts to provide the desired frictional engaging surfaces and which would permit the parts to slide back to a normal position to facilitate retrieval of the bolt after usage.

Thus, as shown in the drawings in FIGS. 3 and 4, the threaded extremity 40 terminates in a sloped portion 42 to an inactive section of the bolt part 45 which is slightly less than or approximately a semi-cylindrical section. This inactive section or portion of the bolt, as will be hereinafter noted, may be made of any desired length depending upon the overall length of the desired bolt or the application of the same. Normally, bolt structures are held to fixed diametrical sizes to facilitate drill holes in anchoring applications and the smaller the diameter of the drill hole will reduce the time and expense in application of the bolt. It will also aid in standardizing drill sizes for application for the same. In the example disclosed in the drawing, the inactive portion of the bolt will be made approximately twice the length of the active portion of the bolt to define a two inch diameter bolt size with an overall five foot length. This inactive portion extends toward the opposite extremity of the bolt or the active portion thereof, which is indicated at 48. The end of the active portion is substantially equal to the overall diametrical dimension of the composite bolt structure and is hemispherical to define a ball end for ease in bolt removal after usage. The camming surface 50 is defined by passing a plane through the cylindrical form of the bolt from the extremity of the same opposite the threaded extremity 40 toward the inactive section and to or below the center line of the bolt. Generally this camming angle for given diametrical dimensions will be somewhere between 2° and 4° and no greater than 6°. In the present disclosure, it is approximately 2 ½° from the center line and extending from the inactive section of the bolt over the remaining one-third of the same but following within the general circumferential form of the composite bolt at the extremity of the same.

Thus, in the plan view of FIG. 3, the inactive portion of the bolt will appear as a flat horizontal surface which is generally parallel to the center line or axis of the threaded portion 40. However, where the threaded portion and the overall bolt structure have the same dimension, the center line will pass through the center line of the composite bolt structure. The active portion or section of the bolt is defined by a plane inclined surface with the remaining surface of the active portion defining a circular peripheral surface of a radial dimension coincident with the overall radial or diametrical dimension of the composite bolt structure.

The bolt part 30 is defined by a transversely extending flange portion 60 at one extremity which is generally rectangular in cross section and which has welded thereto the shank portion of the bolt starting with the inactive section portion 70 which has a form slightly larger than the semi-cylinder and a plane surface which will mate with the inactive portion 45 of the part 20. This inactive portion 70 will be substantially the same length as the inactive portion 45 of the bolt part 20 and will taper therefrom in the active portion of the bolt, as indicated at 80, to provide a mating surface with the inclined surface of the active portion 50 of the bolt part 20. That is, this portion of the bolt will be defined by passing a plane through the composite cylinder at an angle of from 2° to 4° to the center line of the composite bolt structure extending from a point within the peripheral outline of the active end of the bolt part 30 and extending to the flat surface 70 of the inactive portion which, when the bolt parts are placed together, will be disposed in line with the axis of the threaded shank 40 of the bolt part 20.

Whenever it is desired to use the anchor bolt for securing a piece of machinery in location, such as a drill for drilling in a mining operation or for anchoring a heavy piece of equipment or cable, a suitable hole of a diametrical dimension of approximately equal to the diametrical dimension of the composite bolt will be drilled into the earth and bed rock into which the bolt is to be inserted. The active or cam portion of the bolt in the example shown extends over substantially one-third of its entire length and the overall bolt structure, which is approximately 5 feet in length. The inactive portion exists over two-thirds of this length of the bolt in which the contacting surfaces of the bolt parts 20 and 30 have no inclination relative to the center line thereof. Whenever bed rock or the desired securing surface into which the bolt is to be inserted appears at a different depth, a different length bolt will be used and such bolts may be made in the varying lengths at, for example, in one foot multiples up to any overall desired length. This will enable the diametrical dimension to be standardized for drilling purposes and the overall active length of such securing bolts will remain the same as, for example, approximately 20 inches. Thus, the inactive portions or shanks of the bolt will be of varying sizes and the camming angles will remain substantially the same to facilitate a desired or maximum sloping surface for the bolt diameter which will facilitate proper bolt expansion and a reverse movement for retrieval of the bolt. The wedge angle and relative displacement of the two parts of the bolt determines the expansion force of the same. Rock compressive strength dictates bolt diameter dimension. Thus, the composite bolt will be placed into the drilled hole with the bolt part 30 being positioned below the structure which is to be secured to the earth or rock. Thus, as will be shown in FIG. 1 in phantom, a plate or thickness, indicated at 100 and representing a base plate of a tool or structure to be anchored, will be positioned above or adjacent the flange 60 of bolt part 30. Positioned over the threaded shank 40 of the bolt part 20 is a nut 41 which will be threaded thereon and brought into abutting relationship with the surface of the structure to be secured by the anchor bolt. Advancing this nut on the threaded shank will cause the bolt part 20 to be withdrawn from the hole and relative movement between the bolt parts 20 and 30. Since the inclined surfaces of the bolt parts mate, this will separate the bolt parts in the drilled hole providing for substantially parallel separation of the bolt parts at the inactive section portion and providing an extremely large contacting surface for the drill hole to provide a larger surfaced anchor. The nut 41 may be advanced on the threaded shank 40 of the bolt part 20 until the anchor bolt is rigidly secured in the rock portion with an entire extent of the shank defining the friction engaging surface of the bolt parts. This will provide an extremely rigid anchor capable of securing extremely heavy masses in the hard rock. It will be recognized that by using any length inactive shank, the same operation will exist and bolts of this type may be designed and manufactured for varying depths of application depending upon how deep it is necessary to drill to reach hard rock locations.

While we have shown herein a given length bolt and a particular application for the same, it will be recognized that the bolt may be used to anchor two parts together and that such parts may be manufactured as well as rock structures. Thus, for example, the bolt may be applied to metallic parts to provide a frictional gripping and connecting surface between the same and in concrete structures. The improved bolt structure in addition to being capable of standardization as far as drilling sizes are concerned and parts for the same is also easy to apply and, just as importantly, is retrievable such that the cost of the bolt does not represent a loss after usage. Thus, after the anchoring bolt has served its purpose, it may be retrieved and the costs saved for further usage by simply removing the nut 41 from the threaded shank 40 and hammering or otherwise driving the bolt part 20 back into the hole causing the mating bolt part to go back to the normal or rest position at which time the bolt may be removed from the drill hole and the anchor retrieved.

What is claimed is:

1. An anchor bolt comprising, a pair of mating anchor parts which when combined form an elongated cylindrical rod-like structure having a threaded extremity with a transversely extending flange portion adjacent the same, one of the mating anchor parts including the threaded cylindrical extremity connected to a semi-cylindrical intermediate inactive section with the remaining extent to the opposite extremity being tapered to define an active section from the semi-cylindrical section to an end surface which is less than a complete cylinder, the other of the mating anchor parts being defined by a semi-cylindrical inactive section having the transversely extending flange portion formed integral therewith at the extremity of the same and with the opposite extremity being tapered from the semi-cylindrical intermediate inactive section to a cross section at the other extremity which is less than semi-cylindrical section and when combined with the one of said mating cylindrical parts forms a complete cylindrical surface at this extremity, the pair of mating anchor parts having their respective inactive sections defined by passing a plane through the composite bolt formed of the anchor parts parallel to a center axis of the composite anchor parts and defining a single surface on each part for the inactive sections and the active sections of the anchor parts being defined by passing a plane through the composite anchor parts at an angle to said center axis of the composite angle parts and intersecting the first named plane to define a single tapered surface for each active section of the respective anchor parts, said other extremity of said pair of mating anchor parts combined to form the complete cylindrical surface terminating in a semi-spherical ball extremity.

2. The anchor bolt of claim 1 in which the tapered surfaces of the active section of the anchor bolt parts make an angle of no greater than 6° to the axis of the composite anchor bolt parts.

3. The anchor bolt of claim 1 in which the ratio of the length of the active section of the anchor bolt defined by the tapered surfaces thereon to the diameter of the assembled bolt is at least 10 to 1.

4. The anchor bolt of claim 1 in which the flange portion on said other of said anchor bolt parts extends normal to the extent of the parts in assembled relationship and away from said one of said anchor bolt parts.

5. The anchor bolt of claim 1 in which the parts of the anchor bolt are made of a hardened steel material.

6. The anchor bolt of claim 1 in which the threaded portion of said one of said anchor bolt parts has a cylindrical surface of a different diametrical dimension than the composite of the anchor bolt parts.

7. The anchor bolt of claim 1 in which the tapered surfaces of the active section of the anchor bolt parts make an angle of approximately 2 ½° to the axis of the composite anchor bolt parts.

8. The anchor bolt of claim 1 in which the tapered surfaces of the active section of the anchor bolt parts defined by a plane at an angle to the axis of the composite bolt parts lies at an angle of approximately 2° to 4°.

* * * * *